UNITED STATES PATENT OFFICE.

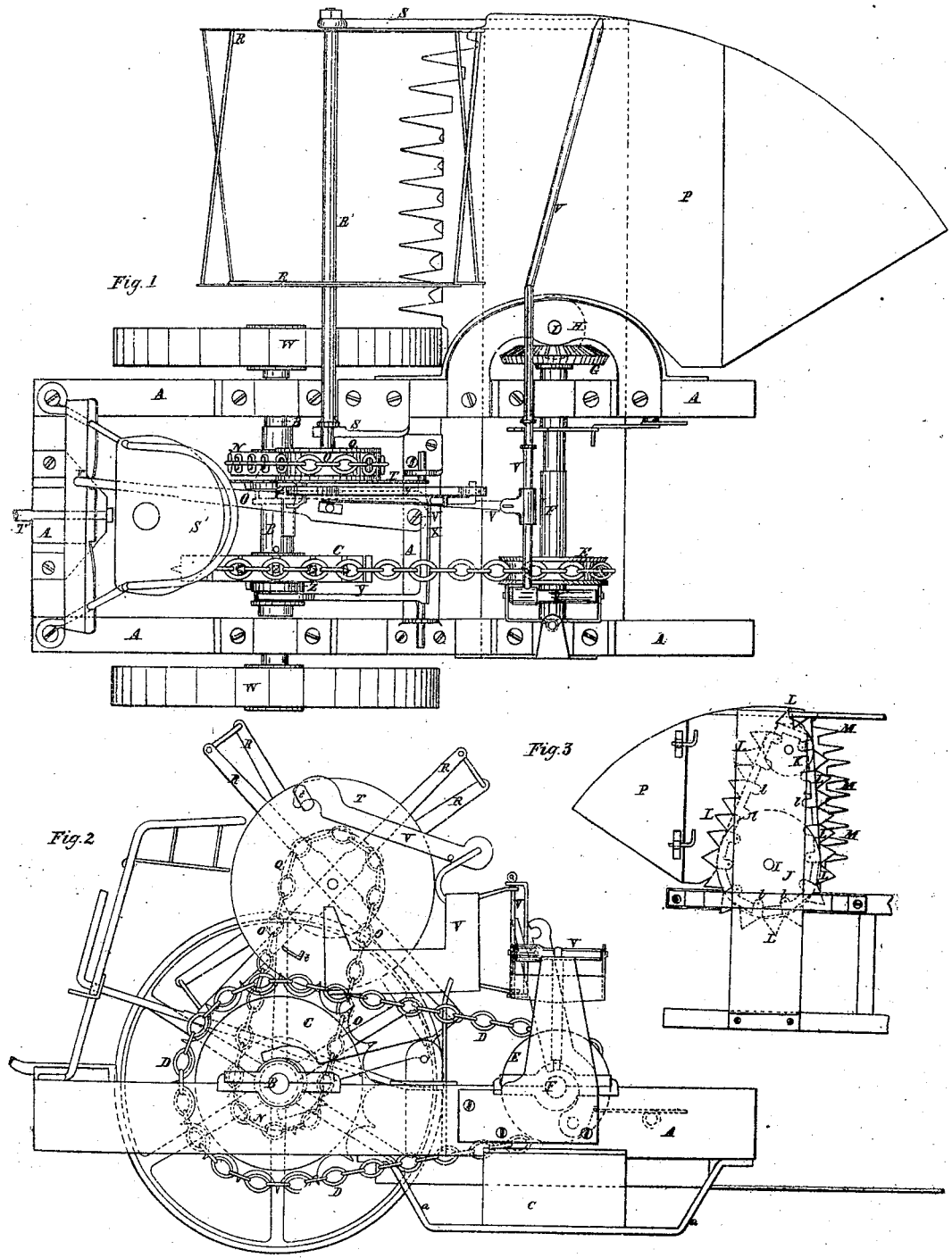

PELEG WERNI, OF CHICAGO, ILLINOIS.

IMPROVEMENT IN HARVESTERS.

Specification forming part of Letters Patent No. 71,097, dated November 19, 1867.

*To all whom it may concern:*

Be it known that I, PELEG WERNI, of Chicago, in the county of Cook and State of Illinois, have invented a new and useful Improvement in Harvesters; and I do hereby declare and make known that the following is a full, clear, and exact description of the same, reference being had to the accompanying drawings, and the letters and figures of reference marked thereon, which form part of this specification.

My said invention relates to a novel method of constructing and operating the sickle of a harvesting-machine; and it consists in constructing said sickle of separate sections of suitable length and connecting sections by links or joints, so as to form an endless jointed sickle, which is arranged upon suitable sheaves or wheels beneath the platform, with the cutting parts or edges out, in such a manner that by revolving one of said sheaves the sickle moves continuously in one direction, instead of in the ordinary reciprocating movement found in machines having sickles of the ordinary construction.

To enable those skilled in the art to understand how to construct and use my said invention, I will proceed to describe the same with particularity, making reference in so doing to the aforesaid drawings, in which—

Figure 1 represents a plan or top view of my invention; Fig. 2, a side elevation of the same; and Fig. 3 is a bottom view of the platform, showing the arrangement and construction of the sickle.

Similar letters of reference in the several figures denote the same parts of my invention.

A represents a rectangular frame, made of wood of any desired size, B being an axle, which is supported in suitable boxes upon the sides of said frame, upon which wheels W W, supporting the machine and serving as drive-wheels, are rigidly fixed, so that the revolution of the wheels causes said axle to rotate continually while the machine is moved over the ground.

Upon said axle are arranged two wheels, C and N, whose circumferences are provided with suitable projections, which engage with the links of chains D and O, respectively, whereby the sickle is operated in the one case and the reel and rake are operated in the other case. Said wheels C and N are so arranged upon said shaft or axle B that said axle may revolve independently of the said wheels, and consequently without rotating said wheels.

Upon said axle are two clutches, Z, one for each of said wheels C and N, which rotate with said axle, but have a sliding longitudinal movement upon the same, and engage with pins or projections upon the sides of said wheels, so that by moving them in contact with said wheels the wheels are made to revolve as desired, while by moving said clutches away from the wheels the machine is thrown out of gear, and may move over the ground without operating the sickle, reel, or rake.

The said clutches are operated as aforesaid by a lever, V, which is fulcrumed at v, being attached at its rear end to a slide, X, provided with arms Y, which stride the said clutches, so that the movement of said lever V by the driver from his seat S will throw the machine into or out of gear, as desired.

The chain D upon the wheel C passes around a wheel, E, upon a horizontal shaft, F, revolving said shaft and the bevel-gear wheel G upon the same, which, gearing into a corresponding wheel, H, upon the vertical shaft I, revolves said shaft I, and also the wheel, sheave, or roller J, under the platform P, around which the endless jointed sickle passes, as also around another sheave, K, near the outer edge of the said platform.

The sickle L is constructed in sections, hinged or linked together at l, as shown, and the sheaves J K are so arranged that said sickle projects the proper distance at the front of the platform to operate as desired with respect to the stationary guards or fingers M.

The remainder of the machine consists in the raking attachment, which I have made application for in a separate and distinct patent, and need not, therefore, be herein described.

Having thus described the construction and operation of my machine, what I claim, and desire to secure by Letters Patent, is—

The combination and arrangement of an endless revolving sickle, L, sheaves J K, gear-wheels G H, shafts F B, wheels C E, and chain D, clutch Z, arm Y, and levers V, operating in the manner and for the purposes set forth.

PELEG WERNI.

Witnesses:
LEWIS L. COBURN,
W. E. MARRS.